US012658474B2

(12) United States Patent
Deng et al.

(10) Patent No.: US 12,658,474 B2
(45) Date of Patent: Jun. 16, 2026

(54) SECONDARY BATTERY

(71) Applicant: SHENZHEN CAPCHEM TECHNOLOGY CO., LTD., Guangdong (CN)

(72) Inventors: Yonghong Deng, Shenzhen (CN); Yunxian Qian, Shenzhen (CN); Shiguang Hu, Shenzhen (CN); Xionggui Lin, Shenzhen (CN); Hongmei Li, Shenzhen (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 632 days.

(21) Appl. No.: 18/010,817

(22) PCT Filed: Nov. 16, 2022

(86) PCT No.: PCT/CN2022/132197
§ 371 (c)(1),
(2) Date: Dec. 16, 2022

(87) PCT Pub. No.: WO2023/124604
PCT Pub. Date: Jul. 6, 2023

(65) Prior Publication Data

US 2024/0136577 A1 Apr. 25, 2024

(30) Foreign Application Priority Data

Dec. 29, 2021 (CN) ......................... 202111647802.8

(51) Int. Cl.

| | |
|---|---|
| ***H01M 10/0567*** | (2010.01) |
| ***H01M 4/02*** | (2006.01) |
| ***H01M 4/50*** | (2010.01) |
| ***H01M 10/0525*** | (2010.01) |
| ***H01M 10/42*** | (2006.01) |

(52) U.S. Cl.
CPC ....... *H01M 10/0567* (2013.01); *H01M 4/502* (2013.01); *H01M 10/4235* (2013.01); *H01M 2004/028* (2013.01); *H01M 10/0525* (2013.01); *H01M 2010/4292* (2013.01)

(58) Field of Classification Search
CPC ..... H01M 10/0567; H01M 2010/4292; H01M 2300/0025; H01M 2300/0091
See application file for complete search history.

(56) References Cited

U.S. PATENT DOCUMENTS

2021/0351438 A1 11/2021 Xu et al.

FOREIGN PATENT DOCUMENTS

| | | | | | |
|---|---|---|---|---|---|
| CN | 101192682 | A | | 6/2008 | |
| CN | 110931863 | A | | 3/2020 | |
| CN | 111106342 | A | * | 5/2020 | ........ H01M 10/0525 |
| CN | 111540945 | A | | 8/2020 | |
| CN | 111755753 | A | | 10/2020 | |
| CN | 111763200 | A | | 10/2020 | |
| CN | 113517434 | A | | 10/2021 | |
| JP | 2015187926 | A | | 10/2015 | |
| JP | 2018073570 | A | | 5/2018 | |
| JP | 2021101432 | A | * | 7/2021 | |
| WO | 2021057483 | A1 | | 4/2021 | |

OTHER PUBLICATIONS

Nagpure, Shrikant C et al. "Impacts of Lean Electrolyte on Cycle Life for Rechargeable Li Metal Batteries." Journal of power sources 407.C (2018): 53-62. Web. (Year: 2018).*

* cited by examiner

*Primary Examiner* — Susan D Leong
*Assistant Examiner* — Timothy G Hemingway

(57) ABSTRACT

In order to solve the problem that the existing manganese-based positive electrode material battery has insufficient high-temperature cycle and high-temperature storage performances due to the dissolution of manganese ions, the present application provides a secondary battery, comprising a positive electrode, a negative electrode and a non-aqueous electrolyte, the positive electrode comprises a positive electrode material layer containing a positive electrode active material, the positive electrode active material comprises a manganese-based material, and the non-aqueous electrolyte comprises a solvent, an electrolyte salt and an additive, and the additive comprises a compound represented by structural formula 1:

Structural formula 1

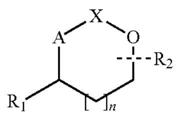

the secondary battery meets the following requirements:

$$0.05 \leq 100 \times W \times u/(q \times s) \leq 5;$$

and 2.0 g/Ah≤W≤4.5 g/Ah, 0.05%≤u≤3.5%, 5%≤q≤65%, 10 mg/cm$^2$≤s≤30 mg/cm$^2$. The The secondary battery has a high capacity retention rate in the cycle and high-temperature storage processes, and has good cycle and storage performances.

7 Claims, No Drawings

SECONDARY BATTERY

TECHNICAL FIELD

The present application belongs to the technical field of energy storage battery devices, and particularly relates to a secondary battery.

BACKGROUND

Since the commercialization of lithium ion batteries in 1990s, lithium ion batteries have been widely used in 3C digital products such as mobile phones and notebook computers because of their advantages of high voltage platform, high energy density, wide temperature range, low self-discharge, no memory effect, and environmental friendliness. At the same time, in recent years, they have been rapidly popularized and developed in the fields of new energy vehicles and large energy storage.

As the technology of lithium ion battery becomes more and more mature, the end users have higher requirements for the safety performance of lithium ion batteries. The element composition of positive electrode active material in lithium ion battery has an important influence on the safety performance of battery. The safety performance of lithium ion battery can be improved by adopting the positive electrode active material with high manganese content. Meanwhile, the cost of manganese is not high, which helps reduce the proportion of expensive metals in materials, and is more conducive to promoting the market application of lithium ion batteries. However, the trivalent manganese element in positive electrode is prone to disproportionation reaction, generating divalent manganese ions soluble in electrolyte, which catalyzes the oxidative decomposition of electrolyte. In addition, the manganese ions migrated to the negative electrode surface will undergo reduction reaction, which will destroy the structure of negative electrode SEI film and catalyze the continuous decomposition of electrolyte on the negative electrode surface, resulting in the loss of active lithium, thus speeding up the capacity attenuation, making the cycle performance and storage performance of lithium ion battery worse, and these influences at high temperature are more serious.

SUMMARY

Aiming at the problems of the insufficient performances of high-temperature cycle and high-temperature storage of the existing manganese-based positive electrode material battery caused by manganese ion dissolution, the present application provides a secondary battery.

The technical solutions adopted by the present application to solve the technical problems are as follows:

The present application provides a secondary battery, including a positive electrode, a negative electrode and a non-aqueous electrolyte, the positive electrode includes a positive electrode material layer containing a positive electrode active material, the positive electrode active material includes a manganese-based material, and the non-aqueous electrolyte includes a solvent, an electrolyte salt and an additive, and the additive includes a compound represented by structural formula 1:

Structural formula 1

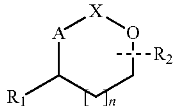

wherein n is 0 or 1, A is selected from C or O, X is selected from

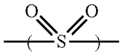 or 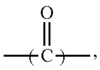, $R_1$ and $R_2$ are each independently selected from H,

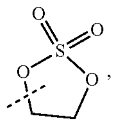, 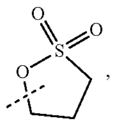, 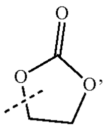, 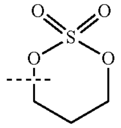 or 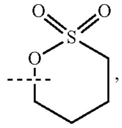, $R_1$ and $R_2$ are not selected from H at the same time, and X, $R_1$ and $R_2$ include at least one sulfur atom;

the secondary battery meets the following requirements:

$$0.05 \leq 100 \times W \times u/(q \times s) \leq 5;$$

and 2.0 g/Ah≤W≤4.5 g/Ah, 0.05%≤u≤3.5%, 5%≤q≤65%, 10 mg/cm$^2$≤s≤30 mg/cm$^2$;

wherein W is a ratio of mass of the non-aqueous electrolyte to rated capacity of the secondary battery, and the unit is g/Ah;

u is a percentage mass content of the compound represented by structural formula 1 in the non-aqueous electrolyte, and the unit is %;

q is a percentage mass content of manganese in the positive electrode material layer, and the unit is %;

s is a surface density of one side of the positive electrode material layer, and the unit is mg/cm$^2$.

Optionally, the secondary battery meets the following requirements:

$$0.1 \leq 100 \times W \times u/(q \times s) \leq 4.$$

Optionally, the ratio (W) of mass of the non-aqueous electrolyte to rated capacity of the secondary battery is 2.0-4.0 g/Ah.

Optionally, the percentage mass content (u) of the compound represented by structural formula 1 in the non-aqueous electrolyte is 0.05%-3.0%.

Optionally, the percentage mass content (q) of manganese in the positive electrode material layer is 5%-50%.

Optionally, the surface density of one side (s) of the positive electrode material layer is 15-25 mg/cm$^2$.

Optionally, the compound represented by structural formula 1 is selected from one or more of the following compounds 1 to 22:

-continued
Compound 1
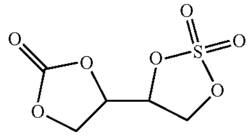
Compound 2
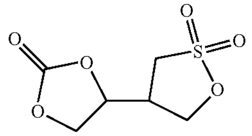
Compound 3
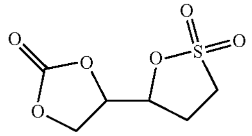
Compound 4
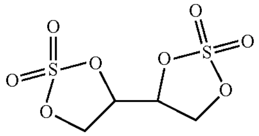
Compound 5
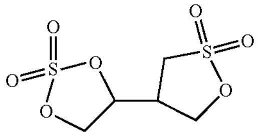
Compound 6
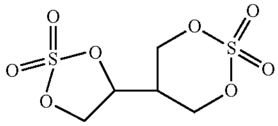
Compound 7
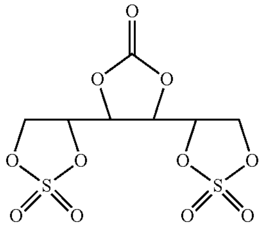
Compound 8
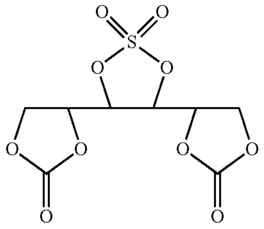
Compound 9
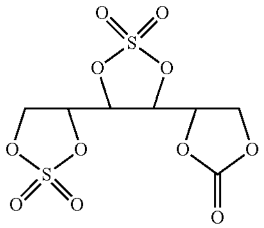
Compound 10
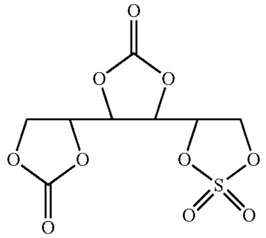
Compound 11
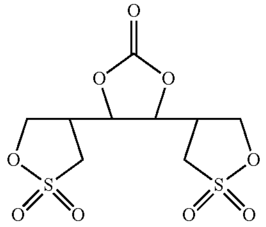
Compound 12
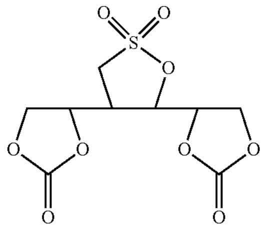
Compound 13
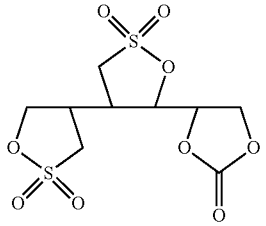
Compound 14
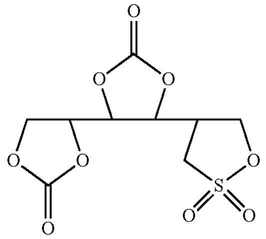
Compound 15
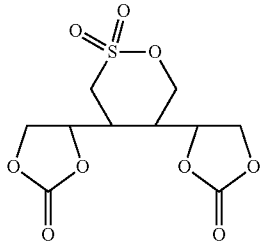

-continued

Compound 16

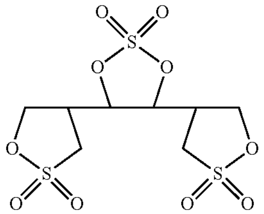

Compound 17

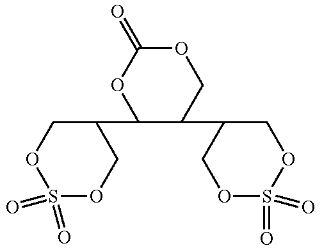

Compound 18

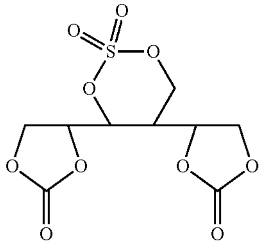

Compound 19

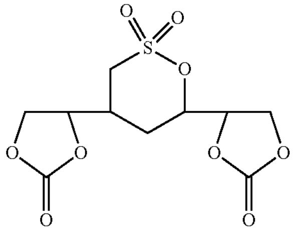

Compound 20

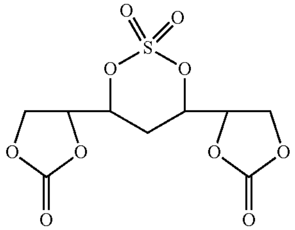

Compound 21

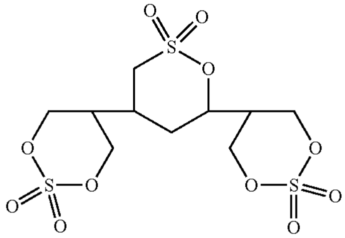

-continued

Compound 22

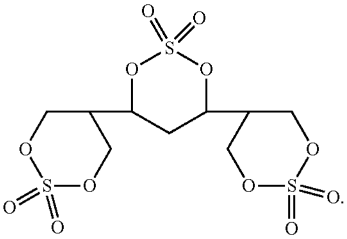

Optionally, the positive electrode active material is selected from one or more compounds represented by formulas (A) and (B):

$Li_{1+x}Ni_aCo_bM'_{1-a-b}O_{2-y}A_y$ Formula (A)

$Li_{1+z}Mn_cL_{2-c}O_{4-d}K_d$ Formula (B)

in formula (A), $-0.1 \leq x \leq 0.2$, $0<a<1$, $0 \leq b<1$, $0<a+b<1$, $0 \leq y<0.2$, M' includes Mn, as well as none, one or more of Al, Sr, Mg, Ti, Ca, Zr, Zn, Si, Fe and Ce, and A includes one or more of S, N, F, B, Cl, Br and I; and in formula (B), $-0.1 \leq z \leq 0.2$, $0<c \leq 2$, $0 \leq d<1$, L includes one or more of Ni, Fe, Cr, Ti, Zn, V, Al, Mg, Zr and Ce, and K includes one or more of S, N, F, B, Cl, Br and I.

Optionally, the non-aqueous electrolyte further includes a supplemental additive, and the supplemental additive include at least one of cyclic sulfate compound, sultone compound, cyclic carbonate compound, phosphate compound, borate compound and nitrile compound.

Preferably, an addition amount of the supplemental additive is 0.01%-30% based on the total mass of the non-aqueous electrolyte being 100%.

Optionally, the cyclic sulfate compound is selected from at least one of ethylene sulfate, propylene sulfate or methyl ethylene sulfate;

the sultone compound is selected from at least one of methylene methyl disulfonate, 1,3-propane sultone, 1,4-butane sultone or 1,3-propene sultone;

the cyclic carbonate compound is selected from at least one of vinylene carbonate, vinylethylene carbonate, fluoroethylene carbonate or a compound represented by structural formula 2;

Structural formula 2

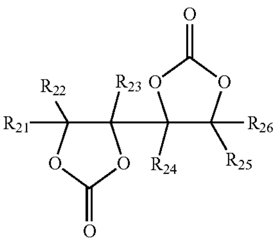

in structural formula 2, $R_{21}$, $R_{22}$, $R_{23}$, $R_{24}$, $R_{25}$ and $R_{26}$ are each independently selected from one of a hydrogen atom, a halogen atom and a C1-C5 group;

the phosphate compound is selected from at least one of tris (trimethylsilane) phosphate and a compound represented by structural formula 3:

Structural formula 3

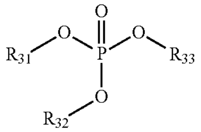

in structural formula 3, $R_{31}$, $R_{32}$ and $R_{33}$ are each independently selected from a C1-C5 saturated hydrocarbon group, an unsaturated hydrocarbon group, a halogenated hydrocarbon group and —$Si(C_mH_{2m+1})_3$, m is a natural number of 1-3, and at least one of $R_{31}$, $R_{32}$ and $R_{33}$ is an unsaturated hydrocarbon group;

the borate compound is selected from tris (trimethylsilane) borate; and the nitrile compound is selected from one or more of butanedinitrile, glutaronitrile, ethylene glycol bis (propionitrile) ether, hexanetricarbonitrile, adiponitrile, pimelic dinitrile, hexamethylene dicyanide, azelaic dinitrile and sebaconitrile.

According to the secondary battery provided by the application, the manganese-based material is used as the main component of positive electrode active material, which has better structural stability, can tolerate more severe structural damage, reduces the thermal-runaway effect caused by the structural damage of the material at high temperature, reduces the side reaction of electrolyte on the solid-liquid interface inside the battery, and reduces the gas generation and heat generation in the battery, thereby effectively improving the safety performance of the secondary battery. Meanwhile, the compound represented by structural formula 1 is added into the non-aqueous electrolyte, and the ratio of the mass of the non-aqueous electrolyte to the rated capacity of the secondary battery and the parameter range of the surface density of one side of the positive electrode material layer are controlled to meet the condition of $0.05\leq100\times W\times u/(q\times s)\leq5$, which can form a dense passivation film at the positive electrode interface, hence stabilizes the positive electrode structure and reduces the dissolution of manganese ions, thus reducing the oxidation of the electrolyte at the positive electrode interface. At the same time, the compound represented by structural formula 1 can also form a protective film on the negative electrode, significantly reducing the damage of dissolved manganese ions to the negative electrode SEI film structure, effectively inhibiting the continuous decomposition of electrolyte at the negative electrode interface, reducing the loss of active lithium, improving the stability of the negative electrode interface, and ensuring a lower interface impedance and appropriate electrolyte viscosity, so as to improve the capacity retention rate of the secondary battery in the cycle and high-temperature storage processes while ensuring the high capacity play and high-rate charge-discharge performance of the secondary battery, thus realizing better high-temperature cycle performance and high-temperature storage performance.

DETAILED DESCRIPTION OF DISCLOSED EMBODIMENTS

In order to make the technical problems to be solved, technical solutions and beneficial effects of the present application more clear, the present application will be further described in detail below with embodiments. It should be understood that the specific embodiments described herein are for the purpose of illustrating the application only, and not intended to limit the application.

The embodiments of the present application provide a secondary battery, including a secondary battery, including a positive electrode, a negative electrode and a non-aqueous electrolyte, the positive electrode includes a positive electrode material layer containing a positive electrode active material, the positive electrode active material includes a manganese-based material, and the non-aqueous electrolyte includes a solvent, an electrolyte salt and an additive, and the additive includes a compound represented by structural formula 1:

Structural formula 1

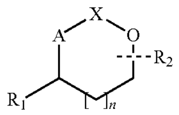

wherein n is 0 or 1, A is selected from C or O, X is selected from

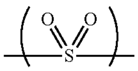 or 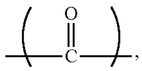, $R_1$ and $R_2$ are each independently selected from H,

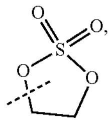, 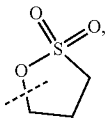, 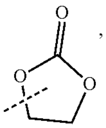, 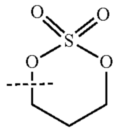 or 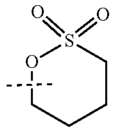, $R_1$ and $R_2$ are not selected from H at the same time, and X, $R_1$ and $R_2$ include at least one sulfur atom;

the secondary battery meets the following requirements:

$$0.05\leq100\times W\times u/(q\times s)\leq5;$$

and 2.0 g/Ah≤W≤4.5 g/Ah, 0.05%≤u≤3.5%, 5%≤q≤65%, 10 $mg/cm^2$≤s≤30 $mg/cm^2$;

wherein W is a ratio of mass of the non-aqueous electrolyte to rated capacity of the secondary battery, and the unit is g/Ah;

u is a percentage mass content of the compound represented by structural formula 1 in the non-aqueous electrolyte, and the unit is %;

q is a percentage mass content of manganese in the positive electrode material layer, and the unit is %;

s is a surface density of one side of the positive electrode material layer, and the unit is $mg/cm^2$.

Manganese-based materials are used as the main components of positive electrode active materials, which have better structural stability, can withstand more severe structural damage, reduce the thermal-runaway effect caused by material structural damage at high temperature, reduce the side reaction of electrolyte on the solid-liquid interface inside the battery, and reduce the gas generation and heat generation in the battery, thus effectively improving the safety performance of secondary batteries. Meanwhile, the compound represented by structural formula 1 is added into the non-aqueous electrolyte, and the ratio of the mass of the non-aqueous electrolyte to the rated capacity of the secondary battery and the parameter range of the surface density of one side of the positive electrode material layer are controlled to meet the condition of $0.05 \leq 100 \times W \times u/(q \times s) \leq 5$, which can form a dense passivation film at the positive electrode interface, hence stabilizes the positive electrode structure and reduces the dissolution of manganese ions, thus reducing the oxidation of the electrolyte at the positive electrode interface. At the same time, the compound represented by structural formula 1 can also form a protective film on the negative electrode, significantly reducing the damage of dissolved manganese ions to the negative electrode SEI film structure, effectively inhibiting the continuous decomposition of electrolyte at the negative electrode interface, reducing the loss of active lithium, improving the stability of the negative electrode interface, and ensuring a lower interface impedance and appropriate electrolyte viscosity, so as to improve the capacity retention rate of the secondary battery in the cycle and high-temperature storage processes while ensuring the high capacity play and high-rate charge-discharge performance of the secondary battery, thus realizing better cycle performance and storage performance.

In some embodiments, when n is 0, the compound represented by structural formula 1 is:

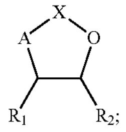

wherein A is selected from C or O, X is selected from

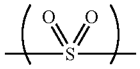 or 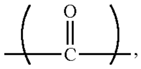, $R_1$ and $R_2$ are each independently selected from H,

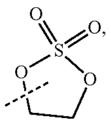, 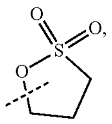, 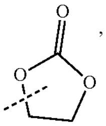,

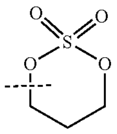 or 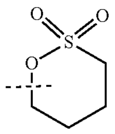, $R_1$ and $R_2$ are not selected from H at the same time, and X, $R_1$ and $R_2$ include at least one sulfur atom.

In some embodiments, when n is 1, the compound represented by structural formula 1 is:

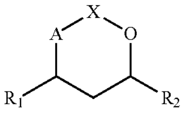 or 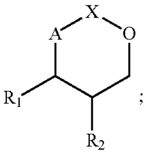;

wherein A is selected from C or O, X is selected from

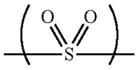 or 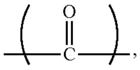, $R_1$ and $R_2$ are each independently selected from H,

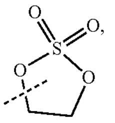, 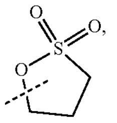, 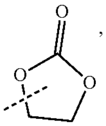,

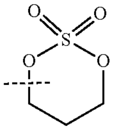 or 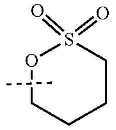, $R_1$ and $R_2$ are not selected from H at the same time, and X, $R_1$ and $R_2$ include at least one sulfur atom.

In a preferred embodiment, the secondary battery meets the following requirements:

$$0.1 \leq 100 \times W \times u/(q \times s) \leq 4.$$

The ratio (W) of the mass of the non-aqueous electrolyte to the rated capacity of the secondary battery, the percentage mass content (u) of the compound represented by structural formula 1 in the non-aqueous electrolyte, the percentage mass content (q) of manganese in the positive electrode material layer, and the surface density of one side (s) of the positive electrode material layer are correlated. The above parameters can combine the effects of additive in the non-aqueous electrolyte and positive electrode active material selection on the high-temperature cycle and high-temperature storage performances of the battery, so as to obtain a secondary battery with excellent high-temperature cycle and high-temperature storage performances.

Specifically, the ratio (W) of the mass of the non-aqueous electrolyte to the rated capacity of the secondary battery is 2.0 g/Ah, 2.1 g/Ah, 2.3g/Ah, 2.5 g/Ah, 2.7 g/Ah, 2.9 g/Ah, 3.0 g/Ah, 3.2 g/Ah, 3.4 g/Ah, 3.6g/Ah, 3.8 g/Ah, 4.0 g/Ah, 4.1 g/Ah, 4.3 g/Ah and 4.5 g/Ah.

In the preferred embodiment, the ratio (W) of the mass of the non-aqueous electrolyte to the rated capacity of the secondary battery is 2.0-4.0 g/Ah.

The ratio (W) of the mass of the non-aqueous electrolyte to the rated capacity of the secondary battery determines the relative mass of the positive and negative electrode materials to the non-aqueous electrolyte in the battery. While the mass of the non-aqueous electrolyte and the percentage mass content (u) of the compound represented by structural formula 1 in the non-aqueous electrolyte determine the total addition amount of the compound represented by structural formula 1 in the secondary battery, When the ratio (W) of the mass of the non-aqueous electrolyte to the rated capacity of the secondary battery is in the above range, the positive and negative electrode active materials, separator, etc. in the battery can be fully soaked by the electrolyte, and there are enough compound represented by structural formula 1 to form a stable passivation film on the electrode surface, so as to ensure the full play of the battery capacity and improve the battery capacity, cycle and storage performances.

Specifically, the percentage mass content (u) of the compound represented by structural formula 1 in the non-aqueous electrolyte is 0.05%, 0.1%, 0.12%, 0.15%, 0.3%, 0.5%, 0.8%, 0.9%, 1.0%, 1.2%, 1.4%, 1.7%, 1.9%, 2.1%, 2.2%, 2.4%, 2.7%, 2.9%, 3.1%, 3.3% or 3.5%.

In a preferred embodiment, the percentage mass content (u) of the compound represented by structural formula 1 in the non-aqueous electrolyte is 0.05%-3.0%.

If the content of the compound represented by structural formula 1 in the non-aqueous electrolyte is too low, the dissolution of manganese ions would not be effectively inhibited, and the stability of the interface between positive and negative electrodes would be reduced. If the content of the compound represented by structural formula 1 in the non-aqueous electrolyte is too high, the interface impedance would be too high, which is not conducive to the battery capacity and rate charge-discharge performance.

Specifically, the percentage mass content (q) of manganese in the positive electrode material layer is 5%., 8%, 10%, 12%, 15%, 19%, 22%, 25%, 29%, 31%, 35%, 37%, 39%, 40%, 43%, 46%, 48%, 50%, 51%, 54%, 57%, 58%, 62%, 64% or 65%.

In a preferred embodiment, the percentage mass content (q) of manganese in the positive electrode material layer is 5% -50%.

If the percentage mass content (q) of manganese in the positive electrode material layer is too low, the safety performance of the secondary battery would be reduced. If the percentage mass content (q) of manganese in the positive electrode material layer is too high, the capacity play and high-temperature storage performance of the secondary battery would be affected.

Specifically, the surface density of one side (s) of the positive electrode material layer is 10 $mg/cm^2$, 12 $mg/cm^2$, 15 $mg/cm^2$, 19 $mg/cm^2$, 21 $mg/cm^2$, 22 $mg/cm^2$, 24 $mg/cm^2$, 26 $mg/cm^2$, 29 $mg/cm^2$ or 30 $mg/cm^2$.

In a preferred embodiment, the surface density of one side (s) of the positive electrode material layer is 15-25 $mg/cm^2$.

When the surface density of one side (s) of the positive electrode material layer is in the above range, the capacity of the positive electrode active material can be effectively played. If the surface density of one side (s) of the positive electrode material layer is too low, less lithium ions would be available and the battery capacity would be low, which is not conducive to improving the energy density of the battery. If the surface density of one side (s) of the positive electrode material layer is too high, it indicates that the positive electrode is coated with too much slurry, which is not conducive to the full infiltration of non-aqueous electrolyte, prolongs the migration path of lithium ions and electrons, and affects the capacity and rate performance of the battery. Especially at the end of cycle, it is easy for the cycle capacity retention rate of the battery to suddenly and rapidly decrease, even leading to gas generation of the battery, which is not conducive to the cycle life of the battery and also creates safety risks.

In the description of the present application, the phrase "surface density of one side of the positive electrode material layer" refers to the coating mass of the positive electrode material layer on one single surface of the positive electrode sheet per unit area. The coating mass testing method may be: prepare 30 pieces of current collector foil, each of which has an area of A1, weigh the mass of each, and take the average value as s1; uniformly coat slurry with the same mass on one side of each current collector foil, then dry at 120° C. for 1 hour, and after detecting that it basically contains no solvent, weigh the dried current collector foil coated with slurry on one side, take the average value as s2; finally, the area density s=(s2−s1)/A1 of one single of the positive electrode material layer on the current collector is obtained.

The above analysis is merely based on the effects of each parameter or multiple parameters on the battery separately, but in the actual battery application process, the parameters such as the ratio (W) of the mass of the non-aqueous electrolyte to the rated capacity of the secondary battery, the percentage mass content (u) of the compound represented by structural formula 1 in the non-aqueous electrolyte, the percentage mass content (q) of manganese in the positive electrode material layer, and the surface density of one side (s) of the positive electrode material layer are related to each other. Through a lot of experiments, the inventor concluded that the relation $0.05 \le 100 \times W \times u/(q \times s) \le 5$ can be effectively used as the basis for testing secondary batteries with excellent cycle performance and storage performance at high temperature.

In some embodiments, the compound represented by structural formula 1 is selected from one or more of the following compounds 1-22:

Compound 1

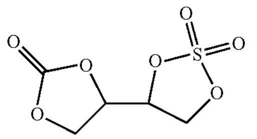

Compound 2

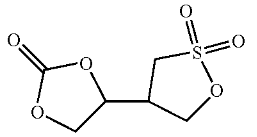

Compound 3

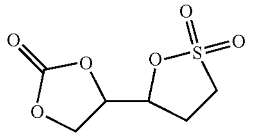

Compound 4

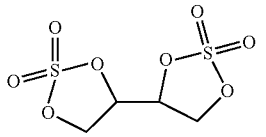

Compound 5

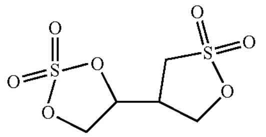

-continued
Compound 6
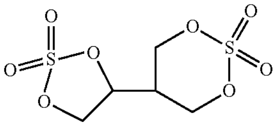
Compound 7
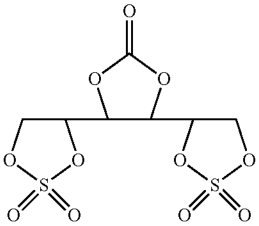
Compound 8
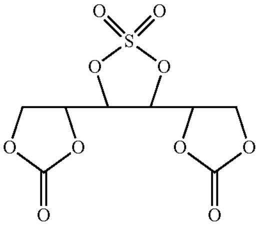
Compound 9
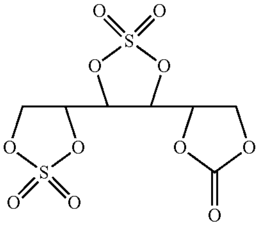
Compound 10
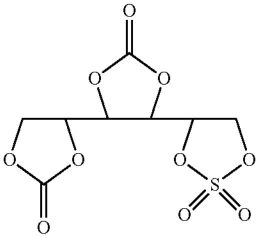
Compound 11
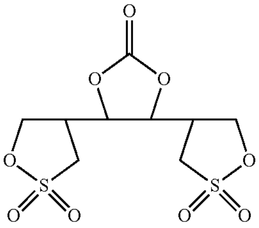
Compound 12
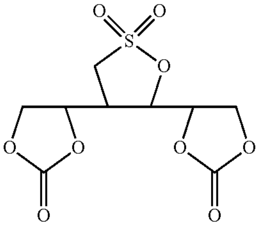
-continued
Compound 13
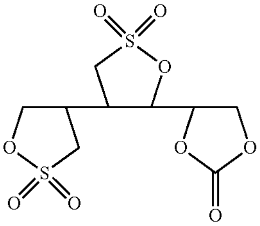
Compound 14
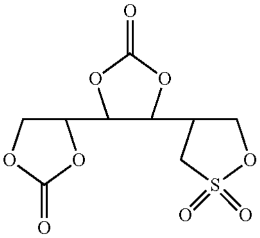
Compound 15
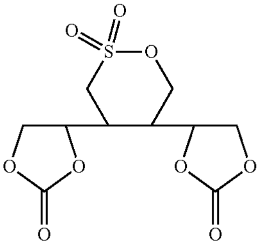
Compound 16
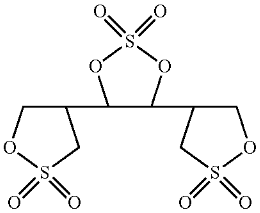
Compound 17
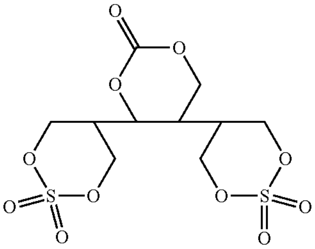
Compound 18
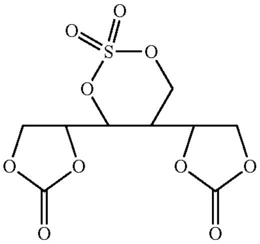

-continued

Compound 19

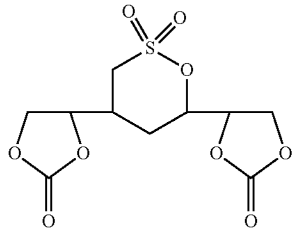

Compound 20

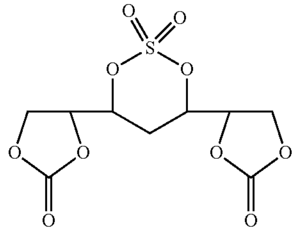

Compound 21

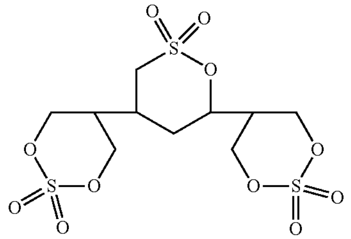

Compound 22

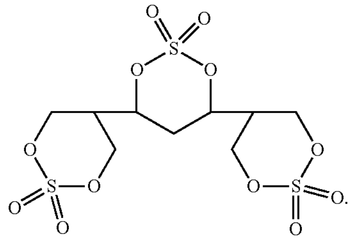

It should be noted that the above are merely the preferred compounds of the present application, not the limitation of the present application.

With the structural formula of the compound represented by structural formula 1, a person skilled in the art may obtain the preparation methods of the above compounds according to the common knowledge in the chemical synthesis field. For example, compound 7 may be prepared by the following method.

Put organic solvents such as sorbitol, dimethyl carbonate, methanol alkaline catalyst potassium hydroxide and DMF into a reaction container, allow them to react for several hours under heating conditions, add a certain amount of oxalic acid to adjust the pH value to be neutral, then filter and recrystallize to obtain an intermediate product 1, and then perform esterification reaction on the intermediate product 1, carbonate, thionyl chloride and the like under high temperature conditions to obtain an intermediate product 2, and oxidize the intermediate product 2 by using an oxidant such as sodium periodate and the like to obtain a compound 7.

In some embodiments, the positive electrode active material is selected from one or more compounds shown in formula (A) and formula (B):

$Li_{1+x}Ni_aCo_bM'_{1-a-b}O_{2-y}A_y$ Formula (A)

$Li_{1+z}Mn_cL_{2-c}O_{4-d}K_d$ Formula (A)

in formula (A), $-0.1 \leq x \leq 0.2$, $0<a<1$, $0 \leq b<1$, $0<a+b<1$, $0 \leq y<0.2$, M' includes Mn, as well as none, one or more of Al, Sr, Mg, Ti, Ca, Zr, Zn, Si, Fe and Ce, and A includes one or more of S, N, F, B, Cl, Br and I; and in formula (B), $-0.1 \leq z \leq 0.2$, $0<c \leq 2$, $0 \leq d<1$, L includes one or more of Ni, Fe, Cr, Ti, Zn, V, Al, Mg, Zr and Ce, and K includes one or more of S, N, F, B, Cl, Br and I.

In some embodiments, the positive electrode further includes a positive electrode current collector, and the positive electrode material layer covers the surface of the positive electrode current collector.

The positive electrode current collector is selected from metal materials that can conduct electrons. Preferably, the positive electrode current collector includes one or more of Al, Ni, tin, copper and stainless steel. In a more preferred embodiment, the positive electrode current collector is selected from aluminum foil.

In some embodiments, the positive electrode material layer further includes a positive electrode binder and a positive electrode conductive agent.

In some embodiments, the positive electrode binder includes one or more of polyvinylidene fluoride, vinylidene fluoride copolymer, polytetrafluoroethylene, vinylidene fluoride-hexafluoropropylene copolymer, tetrafluoroethylene-hexafluoropropylene copolymer, tetrafluoroethylene-perfluoroalkyl vinyl ether copolymer, ethylene-tetrafluoroethylene copolymer, vinylidene fluoride-tetrafluoroethylene copolymer, vinylidene fluoride-trifluoroethylene copolymer, vinylidene fluoride-trichloroethylene copolymer, vinylidene fluoride-fluoroethylene copolymer, vinylidene fluoride-hexafluoropropylene-tetrafluoroethylene copolymer, and thermoplastic resins such as thermoplastic polyimide, polyethylene and polypropylene; acrylic resin; and styrene butadiene rubber.

In some embodiments, the positive electrode conductive agent includes one or more of metal conductive agent, carbon-based material, metal oxide-based conductive agent and composite conductive agent. Specifically, the metal conductive agent may be copper powder, nickel powder, silver powder and other metals. The carbon-based materials may be carbon-based materials such as conductive graphite, conductive carbon black, conductive carbon fiber or graphene. The metal oxide-based conductive agent may be tin oxide, iron oxide, zinc oxide, etc. The composite conductive agent may be composite powder, composite fiber, etc. More specifically, the conductive carbon black may be one or more of acetylene black, 350G, Cochin black, carbon fiber (VGCF) and carbon nanotubes (CNTs).

In some embodiments, the electrolyte salt includes one or more of lithium salt, sodium salt, potassium salt, magnesium salt, zinc salt and aluminum salt. In a preferred embodiment, the electrolyte salt is selected from lithium salt or sodium salt.

In a preferred embodiment, the electrolyte salt is selected from at least one of $LiPF_6$, $LiPO_2F_2$, $LiBF_4$, LiBOB , $LiSbF_6$, $LiAsF_6$, $LiCF_3SO_3$, LiDFOB, $LiN(SO_2CF_3)_2$, $LiC(SO_2CF_3)_3$, $LiN(SO_2C_2F_5)_2$, $LiN(SO_2F)_2$, LiCl, LiBr, LiI, $LiClO_4$, $LiBF_4$, $LiB_{10}Cl_{10}$, $LiAlCl_4$, lithium chloroborane, lithium lower aliphatic carboxylate with 4 or less carbon atoms, Lithium tetraphenylborate and Lithium imino. Specifically, the electrolyte salt may be inorganic electrolyte salts such as $LiBF_4$, $LiClO_4$, $LiAlF_4$, $LiSbF_6$, $LiTaF_6$ and $LiWF_7$; $LiPF_6$ and other fluorophosphoric acid electrolyte salts; $LiWOF_5$ and other tungstic acid electrolyte salts; $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, $CF_3CF_2CF_2CF_2CO_2Li$ and other carboxylic acid electrolyte salt; $CH_3SO_3Li$ and other sulfonic acid electrolyte salts; $LiN(FCO_2)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, cyclic lithium 1,2-perfluoroethylene disulphide, cyclic lithium 1,3-perfluoropropane disulphide and other imide electrolyte salts; LiN(CF3SO2)(C4F9SO2); $LiC(FSO_2)_3$, $LiC(CF_3SO_2)_3$, $LiC(C_2F_5SO_2)_3$ and other methyl electrolyte salts; lithium difluorooxalato borate, lithium bis (oxalato) borate, lithium tetrafluorooxalato phosphate, lithium difluoro bis (oxalato) phosphate, and lithium tri (oxalato) phosphate and other oxalic acid electrolyte salts; and $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, $LiBF_2(C_2F_5SO_2)_2$ and other fluorine-containing organic electrolyte salts, etc.

If the electrolyte salt is selected from other salts such as sodium salt, potassium salt, magnesium salt, zinc salt or aluminum salt, the lithium in the lithium salt may be correspondingly replaced with sodium, potassium, magnesium, zinc or aluminum.

In a preferred embodiment, the sodium salt is selected from at least one of sodium perchlorate ($NaClO_4$), sodium hexafluorophosphate ($NaPF_6$), sodium tetrafluoroborate (NaBF4), sodium trifluoromethylsulfonate (NaFSI) and sodium bis-trifluoromethylsulfonate (NaFSI).

Generally, the electrolyte salt in the electrolyte is the transfer unit of lithium ion, and the concentration of electrolyte salt directly affects the transfer rate of lithium ion, which would affect the potential change of negative electrode. During the rapid charging process of battery, it is necessary to improve the mobility speed of lithium ions as much as possible, so as to prevent the formation of lithium dendrites caused by the rapid decrease of negative electrode potential, which may bring potential safety hazards to battery, and meanwhile, prevent the rapid attenuation of the cycle capacity of battery. Preferably, the total concentration of the electrolyte salt in the electrolyte may be 0.5 mol/L-2.0 mol/L, 0.5 mol/L-0.6 mol/L, 0.6 mol/L-0.7 mol/L, 0.7 mol/L-0.8 mol/L, 0.8 mol/L-0.9 mol/L, 0.9 mol/L-1.0 mol/L, 1.0 mol/L-1.1 mol/L, 1.1 mol/L-1.2 mol/L, 1.2 mol/L-1.3 mol/L, 1.3 mol/L-1.4 mol/L, 1.4 mol/L-1.5 mol/L, 1.5 mol/L-1.6 mol/L, 1.6 mol/L-1.7 mol/L, 1.7 mol/L-1.8 mol/L, 1.8 mol/L-1.9 mol/L, or 1.9 mol/L-2.0 mol/L, and more preferably 0.6 mol/L-1.8 mol/L, 0.7 mol/L-1.7 mol/L, or 0.8 mol/L-1.5 mol/L.

In some embodiments, the non-aqueous electrolyte further includes a supplemental additive, and the supplemental additive include at least one of cyclic sulfate compound, sultone compound, cyclic carbonate compound, phosphate compound, borate compound and nitrile compound.

In a preferred embodiment, the cyclic sulfate compound is selected from at least one of ethylene sulfate, propylene sulfate or methyl ethylene sulfate;

the sultone compound is selected from at least one of methylene methyl disulfonate, 1,3-propane sultone, 1,4-butane sultone or 1,3-propene sultone;

the cyclic carbonate compound is selected from at least one of vinylene carbonate, vinylethylene carbonate, fluoroethylene carbonate or a compound represented by structural formula 2;

Structural formula 2

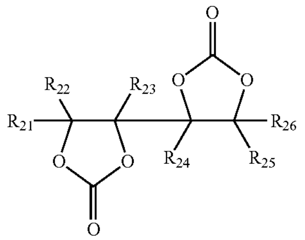

in structural formula 2, $R_{21}$, $R_{22}$, $R_{23}$, $R_{24}$, $R_{25}$ and $R_{26}$ are each independently selected from one of a hydrogen atom, a halogen atom and a C1-C5 group;

the phosphate compound is selected from at least one of tris (trimethylsilane) phosphate and a compound represented by structural formula 3;

Structural formula 3

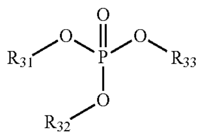

in structural formula 3, $R_{31}$, $R_{32}$ and $R_{33}$ are each independently selected from a C1-C5 saturated hydrocarbon group, an unsaturated hydrocarbon group, a halogenated hydrocarbon group and $—Si(C_mH_{2m+1})_3$, m is a natural number of 1-3, and at least one of $R_{31}$, $R_{32}$ and $R_{33}$ is an unsaturated hydrocarbon group;

In a preferred embodiment, the unsaturated phosphate compound may be at least one selected from the group consisting of tris (trimethylsilane) phosphate, trialpropargyl phosphate, diypropargyl methyl phosphate, diypropargyl ethyl phosphate, diypropargyl trifluoromethyl phosphate, diypropargyl-2,2,2-trifluoroethyl phosphate, diypropargyl-3,3,3-trifluoropropyl phosphate, diallyl hexafluoroisopropyl phosphate, triallyl phosphate, diallyl methyl phosphate, diallyl ethyl phosphate, diallyl propyl phosphate, diallyl trifluoromethyl phosphate, diallyl-2,2,2-trifluoroethyl phosphate, diallyl-3,3,3-trifluoropropyl phosphate and diallyl hexafluoroisopropyl phosphate.

The borate compound is selected from tris (trimethylsilane) borate.

The nitrile compound is selected from one or more of butanedinitrile, glutaronitrile, ethylene glycol bis (propionitrile) ether, hexanetricarbonitrile, adiponitrile, pimelic dinitrile, hexamethylene dicyanide, azelaic dinitrile and sebaconitrile.

In other embodiments, the supplemental additive may also include other additives that can improve the performance of the battery. For example, additives that can improve the safety performance of the battery, flame retardant additives such as fluorophosphate and cyclophosphazene, or overcharge prevention additives such as tert.-amylbenzene and tert-butyl benzene.

In some embodiments, an addition amount of the supplemental additive is 0.01%-30% based on the total mass of the non-aqueous electrolyte being 100%.

It should be noted that, unless otherwise specified, in general, the addition amount of any optional substance of the supplemental additives in the non-aqueous electrolyte is below 10%, preferably 0.1-5%, and more preferably 0.1-2%.

Specifically, the addition amount of any optional substance of the supplemental additives may be 0.05%, 0.08%, 0.1%, 0.5%, 0.8%, 1%, 1.2%, 1.5%, 1.8%, 2%, 2.2%, 2.5%, 2.8%, 3%, 3.2%, 3.5%, 3.8%, 4%, 4.5%, 5%, 5.5%, 6%, 6.5%, 7%, 7.5%, 7.8%, 8%, 8.5%, 9%, 9.5%, 10%.

In some embodiments, when the supplemental additive is selected from fluoroethylene carbonate, the addition amount of fluoroethylene carbonate is 0.05%-30% based on the total mass of the non-aqueous electrolyte being 100%.

In some embodiments, the solvent includes one or more of ether solvent, nitrile solvent, carbonate solvent and carboxylic acid solvent.

In some embodiments, the ether solvent includes cyclic ether or chain ether, preferably chain ether with 3-10 carbon atoms and cyclic ether with 3-6 carbon atoms, and the specific cyclic ether may be but are not limited to 1,3-dioxolane (DOL), 1,4-dioxooxane (DX), crown ether, tetrahydrofuran (THF), 2-methyltetrahydrofuran (2-$CH_3$-THF) and 2-trifluoromethyltetrahydrofuran (2-$CF_3$-THF). Specifically, the chain ether may be but not limited to dimethoxymethane, diethoxymethane, ethoxymethoxymethane, ethylene glycol di-n-propyl ether, ethylene glycol di-n-butyl ether and diethylene glycol dimethyl ether. Dimethoxymethane, diethoxymethane and ethoxymethoxymethane with low viscosity and high ionic conductivity are particularly preferred because the solvability of chain ether and lithium-ions is high and the ion dissociation can be improved. Ether compounds may be used alone or in any combinations and ratios of two or more kinds. The addition amount of ether compound is not particularly limited, which is within the range of not significantly damaging the effect of the high-voltage lithium ion battery of the present application. In the non-aqueous solvent volume ratio of 100%, the volume ratio is usually 1% or more, preferably 2% or more, more preferably 3% or more. Moreover, the volume ratio is usually 30% or less, preferably 25% or less, and more preferably 20% or less. When two or more ether compounds are used in combination, the total amount of ether compounds only needs to be in the above range. When the addition amount of ether compounds is within the above preferred range, it is easy to ensure the improvement effects of ionic conductivity brought by the increase of lithium-ion dissociation degree and the decrease of viscosity of chain ether. In addition, when the negative electrode active material is a carbon material, the co-intercalation reaction of the chain ether and lithium-ions can be suppressed, so that the input-output characteristics and the charge-discharge rate characteristics can be within an appropriate range.

In some embodiments, specifically, the nitrile solvent may be but not limited to one or more of acetonitrile, glutaronitrile and malononitrile.

In some embodiments, the carbonate solvent includes cyclic carbonate or chain carbonate, and the cyclic carbonate may specifically but not exclusively be one or more of ethylene carbonate (EC), propylene carbonate (PC), γ-butyrolactone(GBL) and butylene carbonate (BC). The chain carbonate may specifically but not exclusively be one or more of dimethyl carbonate (DMC), ethyl methyl carbonate (EMC), diethyl carbonate (DEC) and dipropyl carbonate (DPC). The content of cyclic carbonate is not particularly limited, which is within the range of not significantly damaging the effect of the high-voltage lithium ion battery of the present application. However, in the case where one is used alone, the minimal content is usually 3% by volume or more, preferably 5% by volume or more, relative to the total amount of the solvent in the non-aqueous electrolyte. With this range, the decrease of conductivity caused by the decrease of the dielectric constant of the non-aqueous electrolyte can be avoided, so the high-current discharge characteristics, the stability with respect to the negative electrode and the cycle characteristics of the non-aqueous electrolyte battery can easily reach a good range. In addition, the maximum content is usually 90% or less by volume, preferably 85% or less by volume, and more preferably 80% or less by volume. With this range, the oxidation/reduction resistance of the non-aqueous electrolyte can be improved, thus contributing to the improvement of the stability during high-temperature storage. The content of the chain carbonate is not particularly limited, but it is usually 15% or more by volume, preferably 20% or more by volume, and more preferably 25% or more by volume, relative to the total amount of the solvent in the non-aqueous electrolyte. In addition, the volume ratio is usually 90% or less, preferably 85% or less, and more preferably 80% or less. By setting the content of the chain carbonate in the above range, the viscosity of the non-aqueous electrolyte can be easily kept with an appropriate range, and the decrease of ionic conductivity can be suppressed, thus contributing to a good range of the output characteristics of the non-aqueous electrolyte battery. When two or more kinds of chain carbonates are used in combination, the total amount of the chain carbonate only needs to be in the above range.

In some embodiments, it is also preferable to use chain carbonates with fluorine atoms (hereinafter referred to as "fluorinated chain carbonates"). The number of fluorine atoms in the fluorinated chain carbonate is not particularly limited as long as it is 1 or more, but it is usually 6 or less, preferably 4 or less. When the fluorinated chain carbonate has multiple fluorine atoms, these fluorine atoms can be bonded to the same carbon or to different carbons. Examples of the fluorinated chain carbonates include fluorinated dimethyl carbonate derivatives, fluorinated ethyl methyl carbonate derivatives and fluorinated diethyl carbonate derivatives.

Carboxylic acid solvent includes cyclic carboxylic ester and/or chain carbonic ester. Examples of cyclic carboxylic ester include one or more of γ-butyrolactone, γ-valerolactone and δ-valerolactone. Examples of chain carbonic ester include one or more of methyl acetate (MA), ethyl acetate (EA), n-propyl acetate (EP), butyl acetate, propyl propionate (PP) and butyl propionate.

In some embodiments, sulfone solvent includes cyclic sulfones and chain sulfones, but preferably, in the case of cyclic sulfones, it is usually a compound with 3-6 carbon atoms, preferably 3-5 carbon atoms; and in the case of chain sulfones, it is usually a compound with 2-6 carbon atoms, preferably 2-5 carbon atoms. The addition amount of the sulfone solvent is not particularly limited, which is within the range of not significantly damaging the effect of the high-voltage lithium ion battery of the present application. Compared with the total amount of solvent in non-aqueous electrolyte, the volume ratio is usually 0.3% or more, preferably 0.5% or more, more preferably 1% or more. Moreover, the volume ratio is usually 40% or less, preferably 35% or less, and more preferably 30% or less. When two or more kinds of sulfone solvent are used in combination, the total amount of the sulfone solvents only needs to meet the above range. When the addition amount of sulfone solvent is within the above range, the electrolyte with excellent high-temperature storage stability is easily to be obtained.

In a preferred embodiment, the solvent is a mixture of cyclic carbonic ester and chain carbonic ester.

In some embodiments, the secondary battery further includes a separator between the positive electrode and the negative electrode.

The separator may be a conventional separator, a polymer membrane, a nonwoven fabric, etc., including but not limited to single-layer PP (polypropylene), single-layer PE (polyethylene), double-layer PP/PE, double-layer PP/PP and triple-layer PP/PE/PP membranes.

The present application will be further illustrated with the following embodiments.

The compounds involved in the following embodiments and comparative examples are shown in the following table:

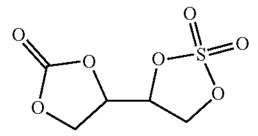 [SMILES: O=C1OCC(C2COS(=O)(=O)O2)O1]

Compound 1

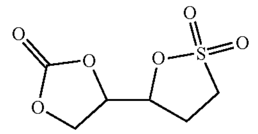 [SMILES: O=C1OCC(C2CCS(=O)(=O)O2)O1]

Compound 3

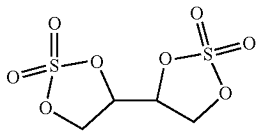 [SMILES: O=S1(=O)OCC(C2COS(=O)(=O)O2)O1]

Compound 4

-continued

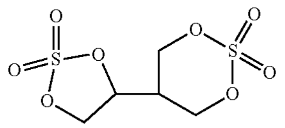 [SMILES: O=S1(=O)OCC(C2COS(=O)(=O)O2)CO1]

Compound 6

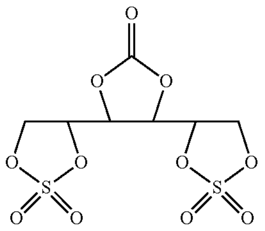 [SMILES: O=C1OC(C2COS(=O)(=O)O2)C(C2COS(=O)(=O)O2)O1]

Compound 7

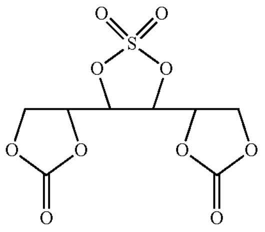 [SMILES: O=C1OCC(C2OS(=O)(=O)OC2C2COC(=O)O2)O1]

Compound 8

TABLE 1

Parameter Design of Embodiments and Comparative Examples

| Groups | Positive electrode active material | Compounds represented by structural formula 1 and contents u/(wt %) | Ratio of mass of the non-aqueous electrolyte to rated capacity of the battery W/(g/Ah) | Percentage mass content of manganese in the positive electrode material layer q/(wt %) | Surface density of one side of the positive electrode material layer s/(mg/cm$^2$) | Supplemental additives | 100 × W × u/(q × s) |
|---|---|---|---|---|---|---|---|
| Embodiment 1 | $LiNi_{0.5}Mn_{0.3}Co_{0.2}O_2$ | Compound 1:1.00 | 2.00 | 17.07 | 16.00 | — | 0.73 |
| Embodiment 2 | $LiNi_{0.5}Mn_{0.3}Co_{0.2}O_2$ | Compound 1:1.00 | 3.00 | 17.07 | 21.00 | — | 0.84 |
| Embodiment 3 | $LiNi_{0.5}Mn_{0.3}Co_{0.2}O_2$ | Compound 1:100 | 3.50 | 17.07 | 18.00 | — | 1.14 |
| Embodiment 4 | $LiNi_{0.5}Mn_{0.3}Co_{0.2}O_2$ | Compound 1:1.50 | 4.50 | 17.07 | 30.00 | — | 1.32 |
| Embodiment 5 | $LiNi_{0.5}Mn_{0.3}Co_{0.2}O_2$ | Compound 1:1.00 | 3.50 | 17.07 | 10.00 | — | 2.05 |
| Embodiment 6 | $LiNi_{0.5}Mn_{0.3}Co_{0.2}O_2$ | Compound 1:1.00 | 4.50 | 17.07 | 25.00 | — | 1.05 |
| Embodiment 7 | $LiNi_{0.5}Mn_{0.3}Co_{0.2}O_2$ | Compound 1:0.05 | 3.60 | 17.07 | 11.00 | — | 0.10 |
| Embodiment 8 | $LiNi_{0.5}Mn_{0.3}Co_{0.2}O_2$ | Compound 1:0.08 | 2.00 | 17.07 | 18.00 | — | 0.05 |
| Embodiment 9 | $LiNi_{0.5}Mn_{0.3}Co_{0.2}O_2$ | Compound 1:0.50 | 2.50 | 17.07 | 16.00 | — | 0.46 |
| Embodiment 10 | $LiNi_{0.5}Mn_{0.3}Co_{0.2}O_2$ | Compound 1:2.00 | 3.20 | 17.07 | 17.00 | — | 2.21 |
| Embodiment 11 | $LiNi_{0.5}Mn_{0.3}Co_{0.2}O_2$ | Compound 1:3.50 | 2.80 | 17.07 | 28.00 | — | 2.05 |
| Embodiment 12 | $LiNi_{0.5}Mn_{0.3}Co_{0.2}O_2$ | Compound 1:3.10 | 3.55 | 17.07 | 12.90 | — | 5.00 |
| Embodiment 13 | $LiNi_{0.5}Mn_{0.3}Co_{0.2}O_2$ | Compound 1:2.60 | 3.15 | 17.07 | 12.00 | — | 4.00 |
| Embodiment 14 | $LiNi_{0.5}Mn_{0.3}Co_{0.2}O_2$ | Compound 1:1.00 | 2.80 | 17.07 | 16.00 | — | 1.03 |
| Embodiment 15 | $LiNi_{0.6}Mn_{0.2}Co_{0.2}O_2$ | Compound 1:1.00 | 2.90 | 11.33 | 17.50 | — | 1.46 |

TABLE 1-continued

Parameter Design of Embodiments and Comparative Examples

| Groups | Positive electrode active material | Compounds represented by structural formula 1 and contents u/(wt %) | Ratio of mass of the non-aqueous electrolyte to rated capacity of the battery W/(g/Ah) | Percentage mass content of manganese in the positive electrode material layer q/(wt %) | Surface density of one side of the positive electrode material layer s/(mg/cm$^2$) | Supplemental additives | 100 × W × u/(q × s) |
|---|---|---|---|---|---|---|---|
| Embodiment 16 | $LiNi_{0.6}Mn_{0.2}Co_{0.2}O_2$ | Compound 1:0.50 | 2.00 | 11.33 | 25.00 | — | 0.35 |
| Embodiment 17 | $LiNi_{0.6}Mn_{0.2}Co_{0.2}O_2$ | Compound 1:1.50 | 4.50 | 11.33 | 30.00 | — | 1.99 |
| Embodiment 18 | $LiNi_{0.6}Mn_{0.2}Co_{0.2}O_2$ | Compound 1:1.00 | 3.50 | 11.33 | 15.00 | — | 2.06 |
| Embodiment 19 | $LiMn_2O_4$ | Compound 1:3.20 | 3.50 | 60.76 | 20.00 | — | 0.92 |
| Embodiment 20 | $LiMn_2O_4$ | Compound 1:0.50 | 4.00 | 60.76 | 10.00 | — | 0.33 |
| Embodiment 21 | $LiMn_2O_4$ | Compound 1:1.00 | 2.00 | 60.76 | 30.00 | — | 0.11 |
| Embodiment 22 | $LiMn_2O_4$ | Compound 1:1.00 | 3.50 | 60.76 | 15.00 | — | 0.38 |
| Embodiment 23 | $LiNi_{0.5}Mn_{0.3}Co_{0.2}O_2$ | Compound 3:1.00 | 2.80 | 17.07 | 16.00 | — | 1.03 |
| Embodiment 24 | $LiNi_{0.5}Mn_{0.3}Co_{0.2}O_2$ | Compound 4:1.00 | 2.80 | 17.07 | 16.00 | — | 1.03 |
| Embodiment 25 | $LiNi_{0.5}Mn_{0.3}Co_{0.2}O_2$ | Compound 6:1.00 | 2.80 | 17.07 | 16.00 | — | 1.03 |
| Embodiment 26 | $LiNi_{0.5}Mn_{0.3}Co_{0.2}O_2$ | Compound 7:1.00 | 2.80 | 17.07 | 16.00 | — | 1.03 |
| Embodiment 27 | $LiNi_{0.5}Mn_{0.3}Co_{0.2}O_2$ | Compound 8:1.00 | 2.80 | 17.07 | 16.00 | — | 1.03 |
| Embodiment 28 | $LiNi_{0.5}Mn_{0.3}Co_{0.2}O_2$ | Compound 1:1.00 | 2.80 | 17.07 | 16.00 | PS 1% | 1.03 |
| Embodiment 29 | $LiNi_{0.5}Mn_{0.3}Co_{0.2}O_2$ | Compound 1:1.00 | 2.80 | 17.07 | 16.00 | DTD 1% | 1.03 |
| Embodiment 30 | $LiNi_{0.5}Mn_{0.3}Co_{0.2}O_2$ | Compound 1:1.00 | 2.80 | 17.07 | 16.00 | Tripropargyl phosphate 0.5% | 1.03 |
| Embodiment 31 | $LiNi_{0.5}Mn_{0.3}Co_{0.2}O_2$ | Compound 1:1.00 | 2.80 | 17.07 | 16.00 | Butanedinitrile 1% | 1.03 |
| Comparative Example 1 | $LiNi_{0.5}Mn_{0.3}Co_{0.2}O_2$ | — | 2.80 | 17.07 | 16.00 | — | — |
| Comparative Example 2 | $LiNi_{0.5}Mn_{0.3}Co_{0.2}O_2$ | Compound 1:3.00 | 4.00 | 17.07 | 12.00 | — | 5.86 |
| Comparative Example 3 | $LiNi_{0.5}Mn_{0.3}Co_{0.2}O_2$ | Compound 1:0.10 | 2.10 | 17.07 | 28.00 | — | 0.04 |
| Comparative Example 4 | $LiNi_{0.5}Mn_{0.3}Co_{0.2}O_2$ | Compound 1:0.50 | 1.60 | 17.07 | 20.00 | — | 0.23 |
| Comparative Example 5 | $LiNi_{0.5}Mn_{0.3}Co_{0.2}O_2$ | Compound 1:1.00 | 5.00 | 17.07 | 16.00 | — | 1.83 |
| Comparative Example 6 | $LiNi_{0.5}Mn_{0.3}Co_{0.2}O_2$ | Compound 1:4.00 | 3.00 | 17.07 | 15.50 | — | 4.54 |
| Comparative Example 7 | $LiNi_{0.5}Mn_{0.3}Co_{0.2}O_2$ | Compound 1:0.03 | 4.30 | 17.07 | 10.50 | — | 0.07 |
| Comparative Example 8 | $LiNi_{0.5}Mn_{0.3}Co_{0.2}O_2$ | Compound 1:1.80 | 2.40 | 17.07 | 9.00 | — | 2.81 |
| Comparative Example 9 | $LiNi_{0.5}Mn_{0.3}Co_{0.2}O_2$ | Compound 1:0.90 | 3.20 | 17.07 | 35.00 | — | 0.48 |
| Comparative Example 10 | $LiNi_{0.6}Mn_{0.2}Co_{0.2}O_2$ | Compound 1:3.00 | 3.20 | 11.33 | 16.00 | — | 5.30 |
| Comparative Example 11 | $LiNi_{0.6}Mn_{0.2}Co_{0.2}O_2$ | Compound 1:2.00 | 3.20 | 11.33 | 10.00 | — | 5.65 |
| Comparative Example 12 | $LiNi_{0.6}Mn_{0.2}Co_{0.2}O_2$ | Compound 1:4.00 | 2.50 | 11.33 | 24.00 | — | 3.68 |
| Comparative Example 13 | $LiNi_{0.6}Mn_{0.2}Co_{0.2}O_2$ | Compound 1:1.50 | 4.50 | 11.33 | 10.00 | — | 5.96 |
| Comparative Example 14 | $LiNi_{0.6}Mn_{0.2}Co_{0.2}O_2$ | Compound 1:3.00 | 2.80 | 11.33 | 10.00 | — | 7.41 |
| Comparative Example 15 | $LiNi_{0.5}Mn_{0.3}Co_{0.2}O_2$ | Compound 1:3.50 | 4.50 | 17.07 | 15.00 | — | 6.15 |
| Comparative Example 16 | $LiNi_{0.5}Mn_{0.3}Co_{0.2}O_2$ | Compound 1:2.50 | 4.00 | 17.07 | 10.00 | — | 5.86 |
| Comparative Example 17 | $LiMn_2O_4$ | Compound 1:0.20 | 2.70 | 60.76 | 25.00 | — | 0.04 |
| Comparative Example 18 | $LiMn_2O_4$ | Compound 1:2.50 | 5.00 | 60.76 | 18.50 | — | 1.11 |

Embodiment 1

This embodiment is used to illustrate the secondary battery and preparation method disclosed by the present application, including the following steps.

1) Preparation of Non-Aqueous Electrolyte

Mix ethylene carbonate (EC), diethyl carbonate (DEC) and ethyl methyl carbonate (EMC) according to the mass ratio of EC:DEC:EMC=3:2:5, and then add lithium hexafluorophosphate ($LiPF_6$) until the molar concentration is 1 mol/L, the additives and contents are shown in Table 1, based on the total mass of the non-aqueous electrolyte being 100%.

2) Preparation of Positive Electrode Plate

Mix the positive electrode active material, conductive agent Super-P and binder polyvinylidene fluoride (PVDF) according to the mass ratio of NCM523: conductive agent conductive carbon black Super-P: binder polyvinylidene fluoride=97:1.4:1.6, add N-methylpyrrolidone (NMP) and uniformly mix them to obtain a lithium ion battery positive electrode slurry. The selection of the positive electrode active material is shown in Table 1, coat the positive electrode slurry on the current collector aluminum foil, dry at 85° C. and perform cold press, the surface density of one side is shown in Table 1, then cut margins and cut into sheets then into strips, dry under the vacuum condition of 85° C. for 24 h, weld the tabs to obtain a positive electrode sheet of lithium ion battery.

3) Preparation of Negative Electrode Plate

The negative electrode active material graphite, conductive carbon black, thickener CMC and binder SBR are dispersed in solvent deionized water according to the mass ratio of 96:1:1:2, and mixed evenly to obtain a negative electrode slurry; then evenly coat the negative electrode slurry on the negative electrode current collector copper foil; then dry, perform cold press, cut into strips and sheets to obtain a negative electrode sheet.

4) Preparation of Lithium Ion Battery Core

Place a lithium battery separator between the positive plate and negative plate, then wind the sandwich structure consisting of the positive plate, negative plate and separator, flatten the wound body then put it into an aluminum-plastic film; then respectively lead out the lead wires of the positive and negative electrodes, and perform hot press and seal the aluminum-plastic film to obtain a battery core to be injected with liquid.

5) Injection and Formation of Battery Core

In a glove box with dew point controlled below −40° C., inject the electrolyte prepared above into the dried battery core, and then vacuum pack and let it stand for 24 hours. Then follow the steps below to carry out the formation: charging at 0.05C constant current to 3.4V, charging at 0.1C constant current to 3.85V, then aging at 45° C. for 24 h, venting gas, shaping and sealing, then further charging to 4.3 V at 0.2C constant current, the cut-off current is 0.05C, then let stand for 5 min and discharging to 3.0V at 0.2C rate.

Embodiments 2-31

Embodiments 2-31 are used to illustrate the disclosed battery and preparation method, including most of the steps in Embodiment 1, with the difference that:

the additive content of electrolyte and positive electrode material layer shown in Table 1 are adopted.

Comparative Examples 1-18

Comparative Examples 1-18 are used to illustrate the disclosed battery and preparation method, including most of the steps in Embodiment 1, with the difference that:

the additive content of electrolyte and positive electrode material layer shown in Table 1 are adopted.

Performance Test

The lithium ion batteries prepared above were tested as follows.

1) Thermal shock test of lithium ion battery: the lithium ion batteries prepared in Embodiments and Comparative Examples were allowed to stand at 25° C. for 5 minutes, charged to 4.3V at 1C constant current rate, then charged at a constant voltage until the current was less than or equal to 0.05C, and then let stand for 5 minutes. Then, the lithium ion battery was placed in an oven, and the oven temperature was set to rise from 25° C. to 130° C. at a rate of 2° C./min. Monitor the temperature of the battery surface during the heating process and heat preservation process.

2) Test for high-temperature cycle performance of lithium-ion secondary battery: at 45° C., the formed battery was charged to 4.3V at 1C constant current and constant voltage, then charged at constant voltage until the current dropped to 0.05C, and then discharged at 1C constant current to 3.0V. The above steps were repeated, the discharge capacities of the first cycle and the 500th cycle were recorded.

The capacity retention rate of high-temperature cycle was calculated according to the following formula:

Capacity retention rate (%)=discharge capacity of the 500th cycle/discharge capacity of the first cycle×100%.

3) Test for high-temperature storage performance of lithium ion battery.

At 25° C., the lithium ion battery was let stand for 5 minutes, then charged to 4.3V at 1C constant current rate, and charged at a constant voltage until the current was less than or equal to 0.05C, and then let stand for 5 minutes, discharged to 3.0V at 1C constant current rate, and tested to obtain the initial discharge capacity of the lithium ion battery.

At 25° C., the lithium ion battery was let stand for 5 minutes, then charged to 4.3V at 1C constant current, and charged at a constant voltage until the current was less than or equal to 0.05C, then let stand for 5 minutes, and then the fully charged lithium ion battery was stored in an oven at 60° C. for 30 days.

After being stored at high temperature for 30 days, the lithium ion battery was taken out, and naturally cool to 25° C., discharged to 3.0V at 1C constant current rate, and tested to obtain the discharge capacity of the lithium ion battery after 30 days of high-temperature storage.

Capacity retention rate (%) of lithium ion battery after 30 days of high-temperature storage=(discharge capacity after 30 days of high-temperature storage/initial discharge capacity)×100%.

(1) The test results obtained from embodiments 1-22 and comparative examples 1-18 are shown in table 2.

TABLE 2

| Group | Thermal shock test: Maximum surface temperature of battery/° C. | Thermal shock test: Thermal shock process state | After 500 cycles at 45° C. 1 C/1 C Capacity retention rate (%) | After storage at 60° C. for 30 days Capacity retention rate (%) |
|---|---|---|---|---|
| Embodiment 1 | 140.2 | No light fire | 84.5 | 90.1 |
| Embodiment 2 | 141.6 | No light fire | 85.6 | 92.1 |
| Embodiment 3 | 140.9 | No light fire | 84.7 | 90.3 |
| Embodiment 4 | 141.9 | No light fire | 83.7 | 89.6 |
| Embodiment 5 | 138.7 | No light fire | 86.1 | 90.7 |
| Embodiment 6 | 142.0 | No light fire | 84.6 | 89.9 |
| Embodiment 7 | 142.2 | No light fire | 83.5 | 86.3 |
| Embodiment 8 | 140.5 | No light fire | 82.1 | 85.9 |
| Embodiment 9 | 139.7 | No light fire | 85.8 | 87.8 |
| Embodiment 10 | 138.6 | No light fire | 84.6 | 88.2 |
| Embodiment 11 | 139.1 | No light fire | 85.9 | 87.1 |
| Embodiment 12 | 140.7 | No light fire | 83.1 | 85.4 |
| Embodiment 13 | 138.3 | No light fire | 87.1 | 91.1 |
| Embodiment 14 | 139.4 | No light fire | 88.3 | 93.8 |
| Embodiment 15 | 143.6 | No light fire | 86.3 | 92.5 |
| Embodiment 16 | 142.2 | No light fire | 82.3 | 90.4 |
| Embodiment 17 | 143.1 | No light fire | 83.1 | 91.6 |
| Embodiment 18 | 141.5 | No light fire | 87.2 | 92.8 |
| Embodiment 19 | 132.8 | No light fire | 83.5 | 85.4 |
| Embodiment 20 | 130.3 | No light fire | 85.6 | 87.8 |
| Embodiment 21 | 131.4 | No light fire | 81.4 | 83.6 |
| Embodiment 22 | 130.9 | No light fire | 84.7 | 86.6 |
| Comparative Example 1 | 143.5 | Slight sparks appeared | 71.3 | 74.8 |
| Comparative Example 2 | 142.7 | No light fire | 74.3 | 77.3 |
| Comparative Example 3 | 143.1 | No light fire | 72.6 | 76.8 |
| Comparative Example 4 | 142.4 | No light fire | 64.5 | 68.7 |
| Comparative Example 5 | 143.3 | No light fire | 77.1 | 73.8 |
| Comparative Example 6 | 143.1 | No light fire | 73.8 | 74.6 |
| Comparative Example 7 | 143.9 | Slight sparks appeared | 70.6 | 71.5 |
| Comparative Example 8 | 141.7 | No light fire | 75.5 | 77.7 |
| Comparative Example 9 | 143.3 | No light fire | 71.1 | 73.3 |
| Comparative Example 10 | 145.2 | Slight sparks appeared | 73.9 | 77.6 |
| Comparative Example 11 | 144.1 | Slight sparks appeared | 74.3 | 78.1 |
| Comparative Example 12 | 145.8 | Slight sparks appeared | 74.6 | 79.8 |
| Comparative Example 13 | 144.4 | Slight sparks appeared | 74.2 | 77.8 |
| Comparative Example 14 | 143.9 | Slight sparks appeared | 73.9 | 78.4 |
| Comparative Example 15 | 143.3 | No light fire | 74.6 | 78.2 |
| Comparative Example 16 | 142.5 | No light fire | 75.1 | 76.7 |
| Comparative Example 17 | 134.6 | No light fire | 70.3 | 68.9 |
| Comparative Example 18 | 135.1 | No light fire | 72.8 | 71.4 |

It can be seen from the test results of Embodiments 1-22 and Comparative Examples 1-18, when the ratio (W) of the mass of the non-aqueous electrolyte to the rated capacity of the secondary battery, the percentage mass content (u) of the compound represented by structural formula 1 in non-aqueous electrolyte, the percentage mass content (q) of manganese in the positive electrode material layer and the surface density of one side (s) of the positive electrode material layer satisfied the relational expression of $0.05 \le 100 \times W \times u/(q \times s) \le 5$, and 2.0 g/Ah$\le$W$\le$4.5 g/Ah, $0.05\% \le u \le 3.5\%$, $5\% \le q \le 65\%$, 10 mg/cm$^2 \le s \le 30$ mg/cm$^2$, the compound represented by structural formula 1 would undergo oxidative decomposition on the surface of positive electrode material layer, forming a passivation film combined with manganese on the surface of manganese-based material. The passivation film can effectively block the direct contact between the positive electrode active material and non-aqueous electrolyte, provide buffering and ion exchange functions, and simultaneously act with manganese in manganese-based material to inhibit disproportionation reaction of manganese, thus effectively inhibiting manganese ion dissolution of manganese-based material, improving high-temperature stability of battery electrode material and non-aqueous electrolyte, and improving the thermal shock resistance, high-temperature storage performance and high-temperature cycle performance of battery.

It can be seen from the test results of Comparative Examples 2, 3, 10, 11, 13-17 that even though the values of W, u, q and s all meet the limits of their parameter ranges, the high-temperature storage and cycle performances of battery still couldn't reach a good level when the relational expression of $0.05 \leq 100 \times W \times u/(q \times s) \leq 5$ was not satisfied. It indicates that there is an interaction among the ratio (W) of the mass of the non-aqueous electrolyte to the rated capacity of the secondary battery, the percentage mass content (u) of the compound represented by structural formula 1 in the non-aqueous electrolyte, the percentage mass content (q) of manganese in the positive electrode material layer, and the surface density of one side (s) of the positive electrode material layer. When and only when the four are in a balanced state, the electrochemical performance of the battery at high temperature can be improved. Meanwhile, from the test results of Comparative Examples 1, 4-9, 12, and 18, it can be seen that when one of the parameters W, u, q and s exceeds the limited range, even if they met the requirement of the relational expression of $0.05 \leq 100 \times W \times u/(q \times s) \leq 5$, the high-temperature storage and cycle performances of battery were still poor. the ratio (W) of the mass of the non-aqueous electrolyte to the rated capacity of the secondary battery. There is a strong correlation among the percentage mass content (u) of the compound represented by structural formula 1 in non-aqueous electrolyte, the percentage mass content (q) of manganese in the positive electrode material layer and the surface density of one side (s) of the positive electrode material layer. The ratio (W) of the mass of the non-aqueous electrolyte to the rated capacity of the secondary battery and the surface density of one side (s) of the positive electrode material layer would directly affect the infiltration effect of the compound represented by structural formula 1 in the positive electrode material layer, and then affect the decomposition ratio and density of the compound represented by structural formula 1 in the passivation film, as well as the bonding strength with manganese-based material. When the passivation film is not dense enough or has insufficient bonding strength with manganese-based materials, it would not be able to realize a good protective effect on the manganese-based material, which would lead to the dissolution of Mn ions, thus not conducive to the improvement of high-temperature performance and thermal shock resistance of battery.

According to the test results of Embodiments 7-10, with the increase of the percentage mass content (u) of the compound represented by structural formula 1 in the non-aqueous electrolyte, the high-temperature performance of battery was gradually improved, indicating that the passivation film formed by the compound represented by structural formula 1 on the surface of the positive electrode material layer can effectively avoid the direct contact between the positive electrode active material and the non-aqueous electrolyte and inhibit the dissolution of manganese ions. However, when the compound represented by structural formula 1 was added in excess, the high-temperature performance of the battery decreased. It was speculated that the excess compound represented by structural formula 1 increased the impedance of the passivation film, which was not conducive to the capacity of the battery at high temperature.

From the test results of Embodiments 11-22, it can be seen that when different manganese-based materials were used as positive active materials, they all had good synergistic effects with the compound represented by structural formula 1, indicating that manganese in manganese-based materials was the key element working with the compound represented by structural formula 1, and with the increasing manganese content in the positive electrode material layer, the thermal shock resistance of the battery gradually increased, but the high-temperature cycle and high-temperature storage performances of the battery decreased. The reason was that the manganese element in the positive electrode active material was unstable at high temperature, and it was easy to be dissolved out. With the restriction of the ratio (W) of the mass of the non-aqueous electrolyte to the rated capacity of the secondary battery, the percentage mass content (u) of the compound represented by structural formula 1 in the non-aqueous electrolyte, and the surface density of one side (s) of the positive electrode material layer, the thickness and quality of the passivation film on the surface of manganese-based materials could be regulated, thus effectively reducing the battery impedance, inhibiting the dissolution of manganese ions and improving the high-temperature electrochemical performance of battery.

(2) The test results obtained from embodiments 14 and 23-27 are shown in table 3.

TABLE 3

| Group | Thermal shock test: Maximum surface temperature of battery/° C. | Thermal shock test: Thermal shock process state | After 500 cycles at 45° C. 1 C/1 C Capacity retention rate (%) | After storage at 60° C. for 30 days Capacity retention rate (%) |
|---|---|---|---|---|
| Embodiment 14 | 139.4 | No light fire | 88.3 | 93.8 |
| Embodiment 23 | 140.1 | No light fire | 86.2 | 91.4 |
| Embodiment 24 | 139.2 | No light fire | 86.6 | 92.5 |
| Embodiment 25 | 140.7 | No light fire | 85.4 | 91.7 |
| Embodiment 26 | 141.0 | No light fire | 85.8 | 92.0 |
| Embodiment 27 | 140.5 | No light fire | 86.8 | 92.9 |

From the test results in Table 3, it can be seen that in Embodiments 14, 23-27, when different compounds represented by structural formula 1 were used, they still met the requirements of $0.05 \leq 100 \times W \times u/(q \times s) \leq 5$ and the limits of values of W, u, q and s, indicating that cyclic sulfate group commonly contained in different compounds represented by structural formula 1 were involved in the formation of passivation films on the surface of manganese-based material. The passivation film rich in element S produced by decomposition has good bonding strength with manganese-based material, inhibiting the dissolution of manganese ions in the manganese-based material, and avoiding the catalytic decomposition effect of manganese-based material on non-aqueous electrolyte, thus having universal improvements on the high-temperature performance of battery.

(3) The test results obtained from embodiments 14 and 28-31 are shown in table 4.

TABLE 4

| Group | Thermal shock test: Maximum surface temperature of battery/° C. | Thermal shock test: Thermal shock process state | After 500 cycles at 45° C. 1 C/1 C Capacity retention rate (%) | After storage at 60° C. for 30 days Capacity retention rate (%) |
|---|---|---|---|---|
| Embodiment 14 | 139.4 | No light fire | 88.3 | 93.8 |
| Embodiment 28 | 138.2 | No light fire | 88.6 | 95.6 |
| Embodiment 29 | 139.0 | No light fire | 89.5 | 94.3 |
| Embodiment 30 | 137.4 | No light fire | 90.1 | 96.3 |
| Embodiment 31 | 138.8 | No light fire | 87.6 | 94.7 |

According to the test results in Table 4, on the basis of the lithium ion battery system provided by the present application, adding PS, DTD, tripropargyl phosphate, butanedinitrile, etc. as supplemental additives could further improve the cycle performance of battery. It was speculated that the chain length of the product component obtained by decomposing the small molecule cyclic S-containing compounds contained in PS and DTD was shorter than that of the decomposition product of the compound represented by structural formula 1, which could fill the gap between the compound represented by structural formula 1 and the passivation film. Tripropargyl phosphate and butanedinitrile also have low reduction potential, and their phosphorus and nitrogen elements reinforce the passivation film, so as to form a more stable passivation film structure on the surface of the electrode and improve the high-temperature storage stability and high-temperature cycle capacity retention rate of battery.

The above descriptions are only preferred embodiments of the present application, not intended to limit the present application. Any modification, equivalent replacement and improvement within the spirit and principle of the present application shall be included in the scope of protection of the present application.

The invention claimed is:

1. A secondary battery, comprising a positive electrode, a negative electrode and a non-aqueous electrolyte, the positive electrode comprises a positive electrode material layer containing a positive electrode active material, the positive electrode active material comprises a manganese-based material, and the non-aqueous electrolyte comprises a solvent, an electrolyte salt and an additive, and the additive comprises a compound represented by structural formula 1:

Structural formula 1

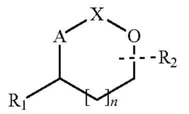

wherein n is 0 or 1, A is selected from C or O, X is selected from

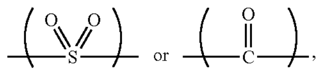

$R_1$ and $R_2$ are each independently selected from H,

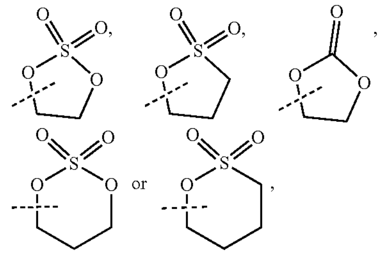

$R_1$ and $R_2$ are not selected from H at the same time, and at least one of X, $R_1$ and $R_2$ comprises at least one sulfur atom;

the secondary battery meets the following requirements:

$$0.73 \le 100 \times W \times u/(q \times s) \le 4;$$

and 2.0 g/Ah≤W≤3.15 g/Ah, 0.05%≤u≤3.0%, 12%≤q≤58%, 12 mg/cm$^2$≤s≤25 mg/cm$^2$;

wherein W is a ratio of mass of the non-aqueous electrolyte to rated capacity of the secondary battery, and the unit is g/Ah;

u is a percentage mass content of the compound represented by structural formula 1 in the non-aqueous electrolyte, and the unit is %;

q is a percentage mass content of manganese in the positive electrode material layer, and the unit is %;

s is a surface density of one side of the positive electrode material layer, and the unit is mg/cm$^2$.

2. The secondary battery of claim 1, wherein the surface density of one side(s) of the positive electrode material layer is 15-25 mg/cm$^2$.

3. The secondary battery of claim 1, wherein the compound represented by structural formula 1 is selected from one or more of the following compounds 1 to 22:

Compound 1

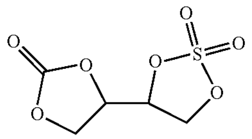

Compound 2

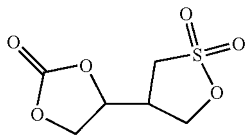

-continued
Compound 3
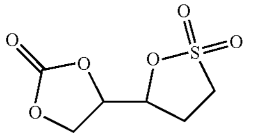
Compound 4
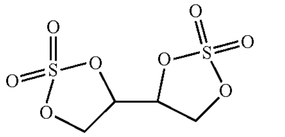
Compound 5
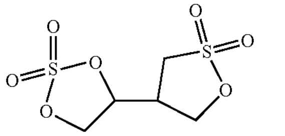
Compound 6
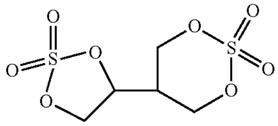
Compound 7
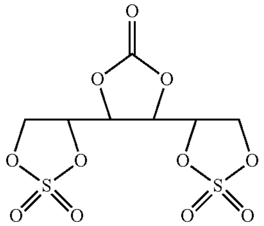
Compound 8
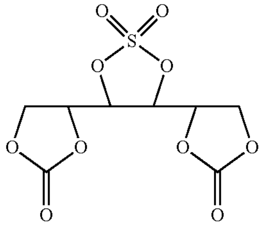
Compound 9
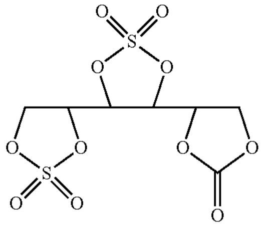
Compound 10
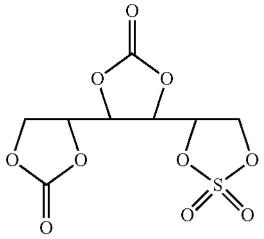
-continued
Compound 11
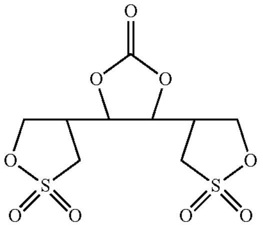
Compound 12
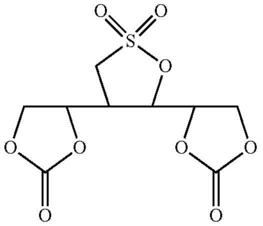
Compound 13
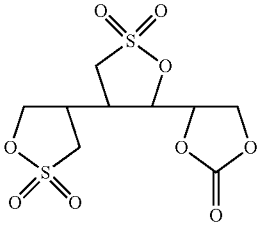
Compound 14
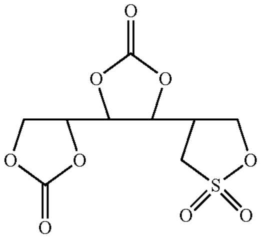
Compound 15
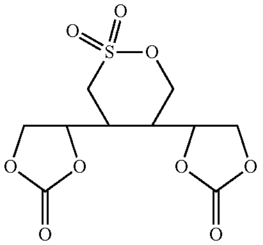
Compound 16
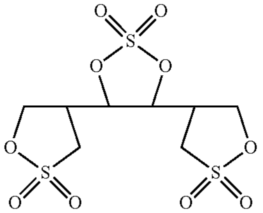

-continued

Compound 17

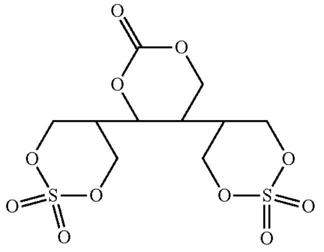

Compound 18

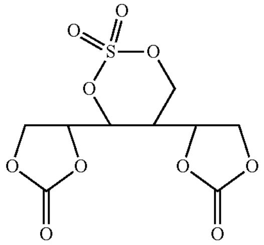

Compound 19

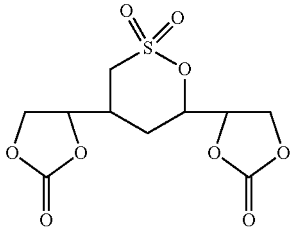

Compound 20

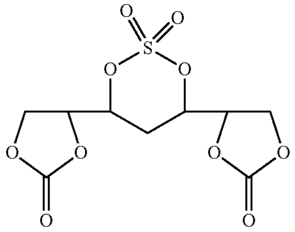

Compound 21

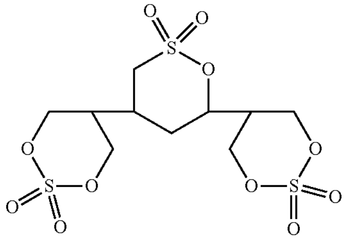

Compound 22

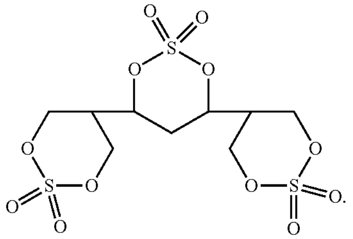

4. The secondary battery of claim 1, wherein the positive electrode active material is selected from one or more compounds represented by formulas (A) and (B):

$Li_{1+x}Ni_aCo_bM'_{1-a-b}O_{2-y}A_y$ Formula (A)

$Li_{1+z}Mn_cL_{2-c}O_{4-d}K_d$ Formula (B)

in formula (A), $-0.1 \le x \le 0.2$, $0<a<1$, $0 \le b<1$, $0<a+b<1$, $0 \le y<0.2$, M' comprises Mn, as well as none, one or more of Al, Sr, Mg, Ti, Ca, Zr, Zn, Si, Fe and Ce, and A comprises one or more of S, N, F, B, Cl, Br and I; and in formula (B), $-0.1 \le z \le 0.2$, $0<c \le 2$, $0 \le d<1$, L comprises one or more of Ni, Fe, Cr, Ti, Zn, V, Al, Mg, Zr and Ce, and K comprises one or more of S, N, F, B, Cl, Br and I.

5. The secondary battery of claim 1, wherein the non-aqueous electrolyte further comprises a supplemental additive, and the supplemental additive comprise at least one of cyclic sulfate compound, sultone compound, cyclic carbonate compound, phosphate compound, borate compound and nitrile compound.

6. The secondary battery of claim 5, wherein an addition amount of the supplemental additive is 0.01%-30% based on the total mass of the non-aqueous electrolyte being 100%.

7. The secondary battery of claim 5, wherein the cyclic sulfate compound is selected from at least one of ethylene sulfate, propylene sulfate or methyl ethylene sulfate;

the sultone compound is selected from at least one of methylene methyl disulfonate, 1,3-propane sultone, 1,4-butane sultone or 1,3-propene sultone;

the cyclic carbonate compound is selected from at least one of vinylene carbonate, vinylethylene carbonate, fluoroethylene carbonate or a compound represented by structural formula 2;

Structural formula 2

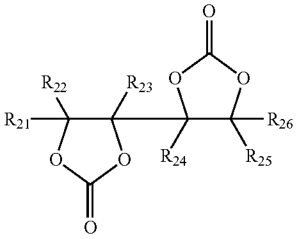

in structural formula 2, $R_{21}$, $R_{22}$, $R_{23}$, $R_{24}$, $R_{25}$ and $R_{26}$ are each independently selected from one of a hydrogen atom, a halogen atom and a C1-C5 group;

the phosphate compound is selected from at least one of tris (trimethylsilane) phosphate and a compound represented by structural formula 3:

Structural formula 3

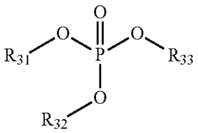

in structural formula 3, $R_{31}$, $R_{32}$ and $R_{33}$ are each independently selected from a C1-C5 saturated hydrocarbon group, an unsaturated hydrocarbon group, a halogenated hydrocarbon group and $—Si(C_mH_{2m+1})_3$, m is a natural number of 1-3, and at least one of $R_{31}$, $R_{32}$ and $R_{33}$ is an unsaturated hydrocarbon group;

the borate compound is selected from tris (trimethylsilane) borate; and the nitrile compound is selected from one or more of butanedinitrile, glutaronitrile, ethylene glycol bis (propionitrile) ether, hexanetricarbonitrile, adiponitrile, pimelic dinitrile, hexamethylene dicyanide, azelaic dinitrile and sebaconitrile.

* * * * *